W. Thompson
Mouth-Piece for Cigars &c
Nº 76119          Patented Mar. 31, 1868.
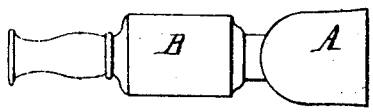
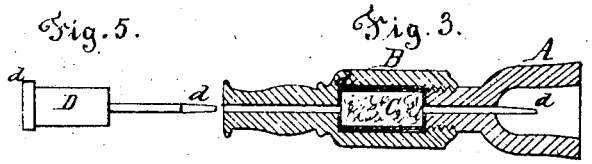 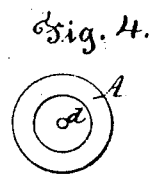
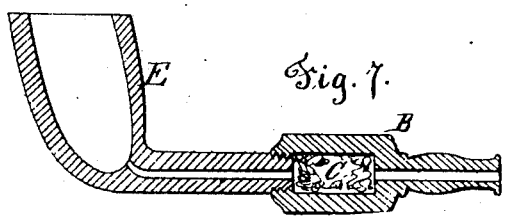
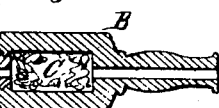
Witnesses.
Patrick Thompson
Patrick Darcy
Inventor.
William Thompson

United States Patent Office.

WILLIAM THOMPSON, OF DUBLIN, IRELAND.

Letters Patent No. 76,119, dated March 31, 1868.

---

MOUTH-PIECE FOR CIGARS, &c.

---

The Schedule referred to in these Letters Patent and making part of the same.

---

TO ALL WHOM IT MAY CONCERN:

Be it known that I, WILLIAM THOMPSON, of No. 85 Lower Gardiner street, in the city of Dublin, and of Clare Hall, in the county of Dublin, Ireland, have invented an Improvement in Mouth-Pieces for Cigars and Pipes; and I do hereby declare that the following is a full and exact description of the said invention, reference being had to the accompanying sheet of drawings, and to the figures and letters marked thereon; that is to say—

My invention has for its object to absorb the deleterious essential and other oils out of tobacco-smoke before it enters the mouth. For this purpose I construct a mouth-piece, of any suitable material, having a chamber, into which is placed a piece of cotton-wool, or other similar loose fibrous substance, through which the smoke has to pass before entering the mouth, and which effectually absorbs the said essential and other oils. The said chamber, with cotton-wool, may be variously arranged. Thus it may form part of the cavity, into which the cigar is inserted, or the cigar may be held by a separate piece, fixed, either by screwing or otherwise, into the end of such chamber, and communicating therewith by a small aperture, or the said chamber may be arranged in any other convenient manner.

In applying the said mouth-piece to pipes, the stem of the latter is simply fixed into the open end of the mouth-piece by screwing or otherwise, in which case, also, the part connected to the pipe-stem may be detachable from the chamber containing the cotton-wool. The cotton-wool or other material may, for the sake of convenience, be contained in a separate casing, which is made to fit inside the chamber of the mouth-piece, and which is perforated to allow the smoke to pass through it, and may be provided at the front end with a small, sharp tube, which enters the cigar, when this is inserted, and thus affords the requisite draught without the necessity of cutting off the end of the cigar. The cotton-wool or other material is renewed from time to time.

Figs. 1 and 2, on the accompanying sheet of drawings, show one mode of applying my invention to cigar-tubes.

Figure 1 shows a side elevation of the tube, and

Figure 2 shows a longitudinal section through the same. The tube consists of two parts, of which the front part A serves to hold the cigar, and screws into the open end of the back part B, in which is formed a chamber, containing the cotton-wool, or other similar fibrous material, C. The smoke, in passing from the cigar, through the tube, has consequently to pass through and give off its essential and other oils to the cotton-wool before it can pass into the mouth.

Figure 3 shows a longitudinal section, and

Figure 4 shows an end view of a mouth-piece, constructed of two parts, A and B, as before described, but in this arrangement the cotton-wool C is placed in a small metallic case, D, shown detached, at Figure 5, having at one end a sharp, open-ended tube, $d$, which projects into the front part A of the tube, as shown, and penetrates into the end of the cigar when this is inserted. At the other end the case has a cover, $d'$, which is removed, to allow of the introduction of the cotton or other wool, and which has perforations to allow the smoke, passing into the case through the tube $d$, to pass out to the mouth after permeating through the cotton-wool. If the case D be made to fit sufficiently tight into the chamber of the mouth-piece, it may also be used without the tube $d$, and having simply perforations in the front end.

Figure 6 shows a section of a mouth-piece for cigars, of only one piece, A, and having simply a cavity in the rear of the open end, into which the cotton or other wool is introduced, or in place of introducing the cotton-wool directly into such cavity, it may be placed in a perforated case, as before described, fitting into such cavity.

Figure 7 shows my invention applied to a pipe. The mouth-piece B, with chamber containing cotton or other wool, C, is similar to that shown in figs. 1 and 2, the stem of the pipe E being screwed or otherwise secured in the mouth-piece, in the same manner as the front part B of the cigar-tube.

Having thus described the nature of my invention, and in what manner the same is to be performed, I wish it to be understood that I do not limit myself to the precise mode of applying my invention to cigar-tubes and pipes, as shown on the accompanying drawings, as various other forms of mouth-pieces may be employed for carrying my invention into effect, but

What I claim, is—

1. The provision, in mouth-pieces for cigars and pipes, of a chamber, containing cotton-wool C, or its equivalent, through which the smoke has to pass on its way to the mouth, substantially as and for the purposes hereinbefore set forth.

2. The employment of a case for containing the cotton or other wool, constructed and operating substantially in manner hereinbefore described, with reference to figs. 3, 4, and 5, on the accompanying drawing.

In testimony whereof, I have signed my name to this specification in the presence of two subscribing witnesses, this thirtieth day of December, one thousand eight hundred and sixty-seven.

WILLIAM THOMPSON.

Witnesses:
 PATRICK THOMPSON,
 PATRICK D'ARCY.